United States Patent [19]

Barkhau et al.

[11] Patent Number: 4,515,614

[45] Date of Patent: May 7, 1985

[54] ELECTRICALLY HEATED FOREHEARTH AND METHOD OF CONTROLLING MOLTEN GLASS TEMPERATURE THEREIN

[75] Inventors: Marvin L. Barkhau, Elmore; Philip D. Perry; Donald H. Poundstone, both of Toledo, all of Ohio; James E. Sherman, Temperance, Mich.

[73] Assignee: Owens-Illinois, Inc., Toledo, Ohio

[21] Appl. No.: 572,287

[22] Filed: Jan. 20, 1984

[51] Int. Cl.³ .................................................. C03B 5/02
[52] U.S. Cl. ........................................ 65/29; 65/162; 65/337; 65/346; 65/356; 65/DIG. 13; 373/40; 373/41
[58] Field of Search ............ 65/29, 162, 337, 346, 65/356, DIG. 4, DIG. 13; 373/40, 41

[56] References Cited

U.S. PATENT DOCUMENTS

| | | | |
|---|---|---|---|
| 1,928,288 | 9/1933 | Henry | 65/162 |
| 3,198,619 | 8/1965 | Nuzum | 65/DIG. 4 |
| 3,954,433 | 5/1976 | Holler | 65/29 |
| 4,323,383 | 4/1982 | Sims | 65/135 |
| 4,389,725 | 6/1983 | Barkhau et al. | 373/40 |

FOREIGN PATENT DOCUMENTS 0681005 8/1979 U.S.S.R. .................... 65/DIG. 4

Primary Examiner—Robert Lindsay
Attorney, Agent, or Firm—John R. Nelson

[57] ABSTRACT

A conditioning section of a forehearth is disclosed with sidewall electrodes for Joule effect heating of glass positioned and connected to confine the current and Joule effect heating separately to the side portions of the molten glass flow path therein. Separate circuits, controls, temperature sensors and temperature set point control means are provided for the sidewall electrodes on each side. Glass temperature across the flow path is controlled and can be adjusted by separately controlling the flow of Joule effect current along each side of the flow path through manual or automatic, thermally actuated, controls for each side.

19 Claims, 3 Drawing Figures

ELECTRICALLY HEATED FOREHEARTH AND METHOD OF CONTROLLING MOLTEN GLASS TEMPERATURE THEREIN

BACKGROUND OF THE INVENTION

Heretofore it has been known to adjust the temperature of molten glass flowing through a forehearth by means of Joule effect heating. Molten glass enters a forehearth at a temperature exceeding that at which it is to be worked into the end product of the glass forming operation. It is cooled as it flows along the forehearth to the point of delivery to forming apparatus even at the maximum rate of draw, without the addition of heat, the glass is at a lower temperature and thus a greater viscosity than is optimum for the glass forming operation. Supplemental heat is applied to the forehearth to retard the rate of cooling of the molten glass or even raise its temperature to the desired working temperature at the point from which it is delivered to forming apparatus.

Electric heating by Joule effect has been employed in various arrangements which frequently seek to establish thermal zones longitudinally of the forehearth, either by the passage of the current supplied across those zones or longitudinal of those zones. Current flow transverse of the stream of molten glass in a forehearth to apply Joule effect heat to longitudinally spaced zones in the molten glass is shown in Henry U.S. Pat. No. 1,928,288 of Sept. 26, 1933 for "Forehearth for Molten Glass and Method of Controlling the Temperature of the Glass Therein". Longitudinal flow of current in the molten glass flowing in a forehearth is shown in Nuzum U.S. Pat. No. 3,198,619 of Aug. 3, 1965 for "Tubular Forehearth for Glass Furnace" and Augsburger U.S. Pat. No. 2,919,297 of Dec. 29, 1959 for "Means of Controlling Electric Currents in a Furnace Forehearth". In Gell U.S. Pat. No. 3,506,769 of Apr. 14, 1970 for "Furnaces for Supplying Molten Glass" there is shown a feeder duct for molten glass in which paired electrodes are arranged in a diagonal relationship to the longitudinal axis of the duct to cause a zig-zag flow of current. Zoned control of Joule effect heating of molten glass in forehearths by sensing current at the downstream electrode of each zone is shown in Stevenson U.S. Pat. No. 4,247,733 of Jan. 27, 1981 for "Electrically Heated Glass Forehearth".

The aforenoted patent disclosures are directed to control of the molten glass temperature longitudinally of the forehearth and thus the flow path to the glass delivery position. In British Pat. No. 1,163,531 by Elemelt Limited, published Sept. 10, 1969 it was recognized that the cross section of the glass in a plane transverse to the length of the forehearth was subject to varying rates of heat exchange in the upper and lower portions and thus tended to have non-uniform temperatures over that cross section. Heat exchange means associated with the upper layer of the glass, gas fired burners and nozzles for introducing cooling air to the free surface of the molten glass were shown with controls for bringing the heating or cooling means into operation as the temperature of the upper portion of the glass stream dictates. The lower layers of the molten glass were heated by Joule effect by passing alternating electric current longitudinally through the glass between electrodes spaced longitudinally along the bottom wall of the forehearth. The heat exchange means cooperating with the upper layers of glass and the electrodes providing the Joule effect heating of the lower layers of glass are segregated into longitudinal zones along the forehearth. A preferred arrangement employs a relatively course adjustment in the upstream zone and a finer adjustment in a downstream zone.

Barkhau et al U.S. Pat. No. 4,389,725 of June 21, 1983 for "Electric Boosting Control for a Glass Forehearth" seeks to further equalize the temperature across a cross section of the conditioning section of a forehearth, that portion immediately preceding the region from which glass is delivered to forming apparatus, by employing longitudinal flow of current along the sidewalls of the conditioning section. It is pointed out that the glass adjacent the sidewalls tends to be cooler than that in the center of the cross section of the forehearth and this tendency can be mitigated by applying controlled current from current sources common to the electrodes on both sidewalls. A temperature sensing means in the glass adjacent a sidewall of the conditioning section is arranged to adjust the current to the electrodes by means of a temperature override circuit which can be set to a desired temperature and a current controller to bring the glass near the sidewall to or nearly to the selected set point.

It has been found that inequalities in the molten glass temperature over the cross section of the conditioning section occur with the arrangement disclosed in the aforenoted U.S. Pat. No. 4,389,725. In order to optimize the state of the molten glass to be issued at the delivery station fed by the forehearth, it is desirable to minimize differences in the temperature of the glass on the opposite sides of the stream flowing to the delivery station.

SUMMARY OF THE INVENTION

This invention relates to apparatus and method for electrically heating glass along the walls of a forehearth at the conditioning section to improve the uniformity of the temperature across a cross section normal to the flow path to the delivery section or feeder. Such improvement is achieved by connecting pairs of electrodes in current communication with the molten glass adjacent respective walls to separate circuit means to which is connected a source of electrical current and a current controller for each circuit whereby the amount of Joule effect heating of the glass proximate each wall of the conditioning section can be controlled individually. The current controllers associated with the electrodes of a wall can be manually adjustable or automatically adjustable as by means of a temperature sensor for sensing the temperature of the glass proximate the wall. Further, an array of temperature sensors across the glass flow can be arranged to interrelate the temperatures of the several portions of the flow with the temperature proximate the walls of the forehearth so that a desired or set point temperature for the glass issued to the feeder can be achieved. The temperature of the glass proximate the opposed sidewalls of the forehearth can thus be brought to the same level which can correspond to the temperature along the centerline of the glass flow. In glass container forming applications these temperatures can be chosen to provide glass in the optimum condition for the forming operation.

DETAILED DESCRIPTION OF THE DRAWINGS

Figure 1:
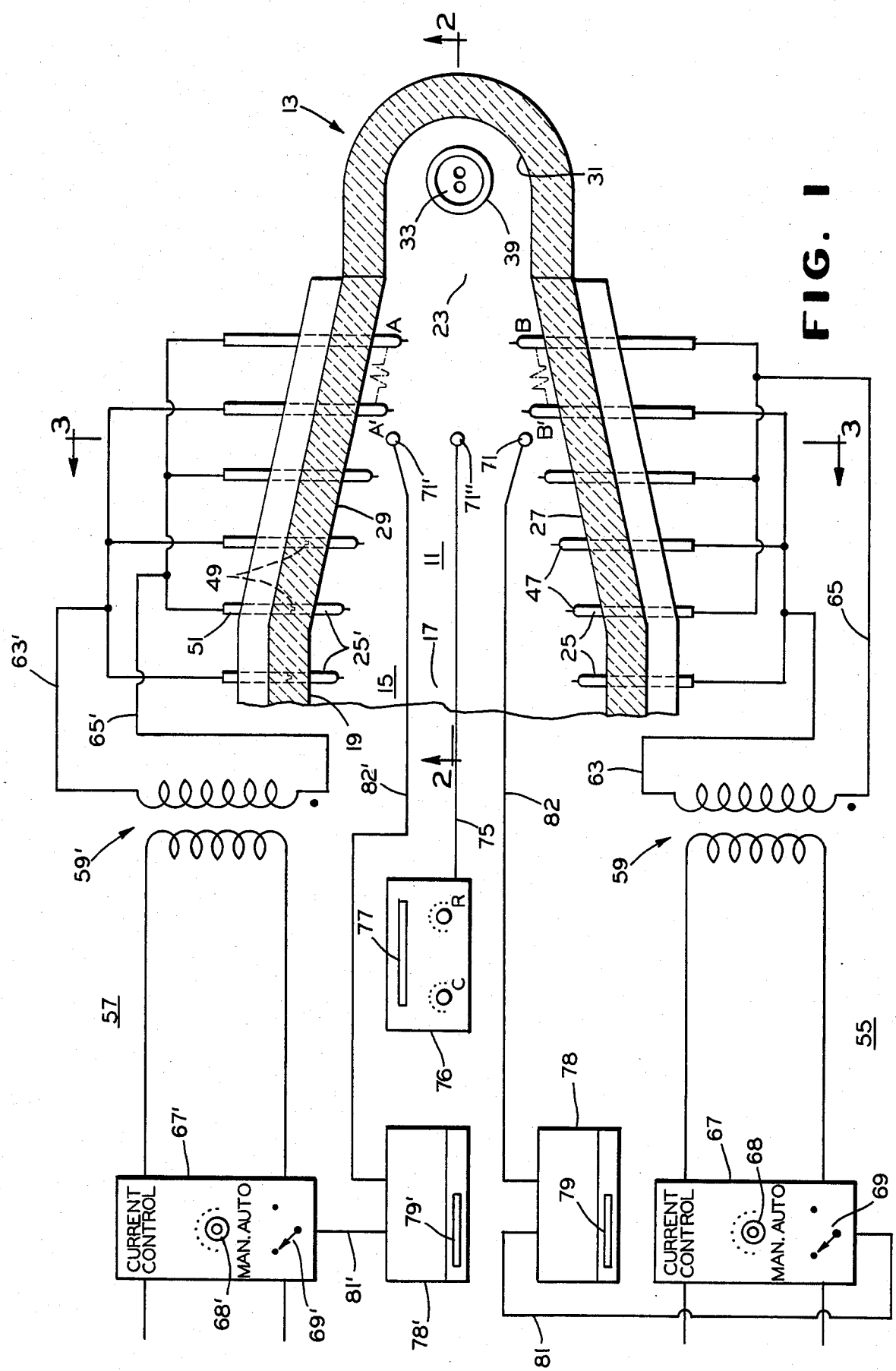
FIG. 1 is a schematic plan view of a feeder and the associated conditioning section of a glass forehearth with electrical circuitry according to this invention.
Figure 2:
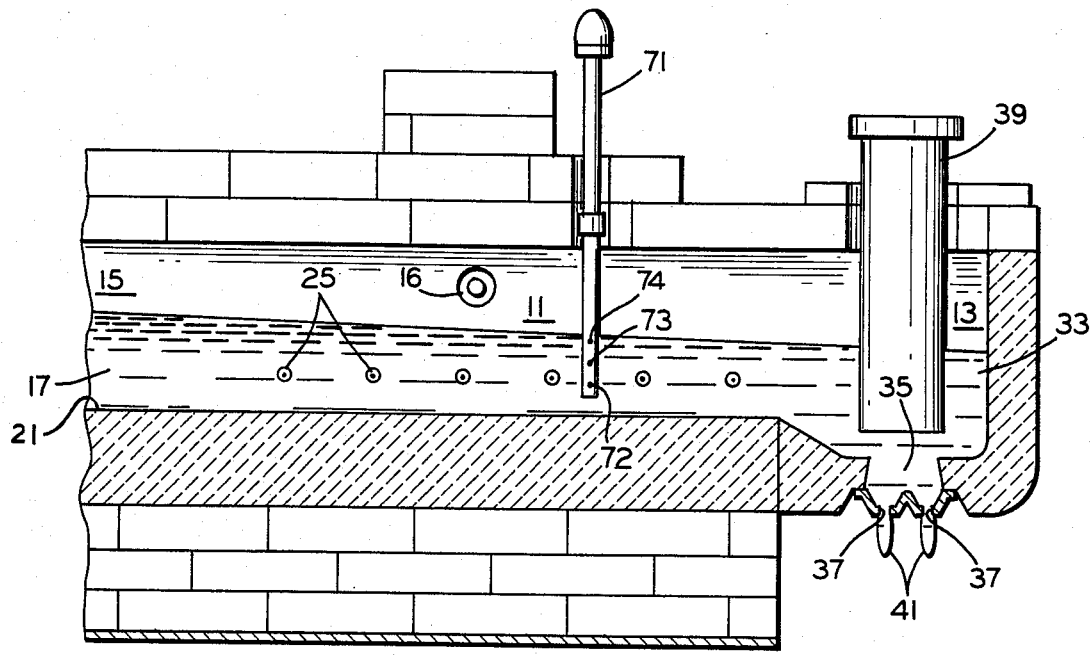
FIG. 2 is a schematic longitudinal elevation sectional view of the structure of FIG. 1 taken along line 2—2 of FIG. 1.
Figure 3:
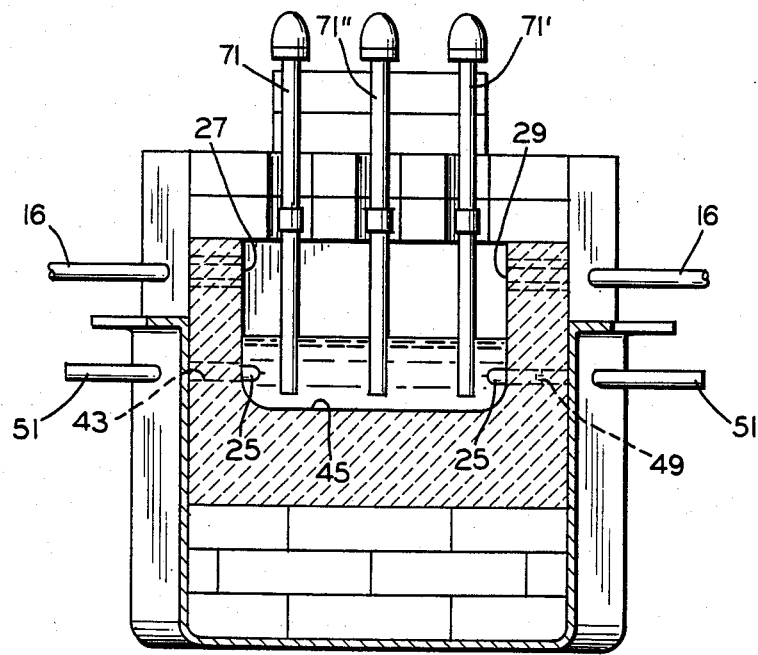
FIG. 3 is a schematic cross sectional view of the structure of FIG. 1 taken along line 3—3 of FIG. 1.

As shown in FIG. 1, the end of the forehearth from which molten glass flows to a feeder, commonly termed the conditioning section 11, is immediately adjacent a feeder 13. The conditioning section 11 is a continuation of the main portion of the forehearth which comprises refractory walled channel 15 extending from a melting and refining glass furnace (not shown). In practice, the refined glass is passed along the forehearth which is arranged to cool the glass toward its working temperature by a proper heat balance of the losses through the forehearth walls and at the free surface of the glass as by cooling air, makeup heat applied as radiant heat over the free surface of the glass, as by the use of one or more burners 16; or by Joule effect heat applied to the glass through electrodes 25 immersed therein or a combination of such heat sources. At the inlet 17 to the conditioning section, the bulk of the glass has been brought nearly to its feeder delivery temperature. However, because of the construction of the forehearth and the nature of the heat transfer characteristics, the glass temperature across its cross section normal to the longitudinal flow path defined by the forehearth sidewalls 19 and bottom 21 is not as uniform as desired for delivery to feeder 13.

Absent Joule effect heating in the conditioning section in one typical forehearth for a glass container forming system the temperature of the glass at three depths in the glass at the relative cool side of the forehearth may be 2069° F. (1132° C.) near the bottom, 2087° F. (1142° C.) at the middle and 2110° F. (1154° C.) near the surface. The opposite side of the forehearth may have comparable temperatures of 2083° F. (1139° C.) near the bottom, 2096° F. (1147° C.) in the middle and 2115° F. (1157° C.) near the surface. Temperatures at the center of forehearth may be 2120° F. (1160° C.), 2121° F. (1160° C.) and 2125° F. (1163° C.) near the bottom, in the middle and near the surface, respectively. Thus it can be seen that if one were to apply Joule effect heating to such a forehearth without having a separate side control, there would not be any way to achieve a uniform temperature across the width and depth of the forehearth. If heat were added so as to raise the cold side, the hot side would become even hotter and the temperatures in the center would no doubt become raised as well. The Joule effect heating is generally applied at a depth between the middle and lower temperature indicated locations.

It should be kept in mind that a typical forehearth in a glass container forming plant will be fed from a refiner and furnace, with the refiner connected to several additional forehearths. Most forehearths will have a cold side and hot side, depending upon the direction of the glass flow from the refiner entering the forehearth. It is the side-to-side unbalance in temperature which the present invention is intended to provide a means of correcting.

The temperature of the glass adjacent the sides is usually cooler because of the heat losses through the sidewalls and the cooler glass is more viscous and the flow rate will be slower resulting in the cooling to be even greater.

When the glass passing through the forehearth is cooler than the center along both sides, then it is possible to achieve a balanced temperature by using the teachings of the Barkan et al patent. Where the unbalance in temperature is not symmetrical to the center of the forehearth, it is extremely difficult to achieve a balance.

It is found that the better the temperature balance across the feeder entrance, the more uniform will be the weight and temperatures of gobs issuing from the feeder. This uniformity of weight and temperature of the gobs contributes to the ability to make glass containers that have superior glass distribution in the walls and therefore permit containers to be made strong with a minimum of glass.

The feeder comprises a semicircular chamber or bowl 33 having a wall 31 spaced the diameter of the semicircle and extending to the walls 27 and 29 of the conditioning section to provide smooth flow lines for the molten glass from the conditioning section to the bowl 33. The bowl 33 contains a bottom opening or spout 35 at its center. The spout is of circular form with a lower circular opening in the bottom thereof. This lower opening is closed by a ceramic member having flow orifices 37 for providing one or more streams of glass which issue downwardly therethrough and are cut into discrete mold charges (by means now shown) for the container forming equipment (not shown).

Concentric above the opening is a cylindrical tube 39 termed a "feeder tube". This tube is rotated about its vertical axis and thereby mixes and circulates the glass around the outside thereof to further equalize its temperature. The lower end of the tube 39 is positioned with respect to the upper edge of the spout 35 to control the flow rate of glass through the opening. A vertical plunger (not shown) within the tube is reciprocated vertically to extrude glass on its downward stroke and to stop or retard the glass stream 41 on its upward stroke. The plunger is synchronized with shears positioned below the orifices to cut the stream or streams into discrete mold charges for the forming machine.

According to the present invention, the temperature of the glass adjacent the opposed sidewalls of the conditioning section is made more uniform by providing means to separately control the current passed through the glass proximate each sidewall. This enables near total equalization of the temperature of the glass streams fed to the spout thereby enhancing the precision with which the glass can be formed into containers.

Conditioning section 11 has sidewalls 27 and 29 which converge from the forehearth main channel width to the feeder diameter. Typically a portion of the forehearth having parallel sidewalls is utilized as the upstream end of the conditioning section. A forehearth having its walls spaced about 91.4 cm. (36 inches) provides a parallel walled upstream end portion of the conditioning section. From the upstream end portion the sidewalls converge to a spacing of about 55.8 cm. (22 inches) over a longitudinal distance of about 122 cm. (4 feet). The depth of glass in such a channel is between about 11.4 cm. (4.5 inches) and 15.2 cm. (6 inches).

Typically, three pairs of electrodes 25 are mounted to project through suitable apertures 43 in each sidewall of the conditioning section. These electrodes are horizontal and and at about half the depth of the glass from the bottom 45 of the conditioning section. They can be molybdenum in the form of right circular cylindrical rods of 3.2 cm. (1¼ inches) diameter having a full radius on the end 47 which extends into the molten glass. While the rods may be integral members, they may also be separable with a coupling 49 on the end which extends into the refractory wall. The rod end is sealed from the molten glass by a frozen glass seal in the wall. The outer end of each electrode is coupled to a conductive support rod 51 providing an electrical connection thereto.

In order to concentrate the flow of electric current in the molten glass flowpath along the sidewalls 27 and 29 of the conditioning section, the electrodes 25 extend a relatively short distance into the glass, typically about ten centimeters (four inches) and are closely spaced as circuit pairs along the sidewalls. Paired electrodes in the exemplary embodiment are longitudinally spaced along the section and glass flow path about 20.3 cm. (8 inches). The most proximate ends of opposed electrodes, those nearest the inlet 23, are spaced about 41.5 cm. (16.4 inches) across a cross section normal to the glass flow path. Thus, a short electric current path through the electric resistance of the glass and a low resistance is presented between paired electrodes from a common wall. This concentrates the Joule effect heating of the glass along the sidewalls in the conditioning section. Isolation of the electrodes 25 from those in the opposite wall is a result of the separate transformers 59 and 59'. In the example illustrated, the ends of opposed electrodes on a common cross section is 71.4 cm (28.1 inches) in the full width portion of the conditioning section.

In order to schematically represent the concentration of Joule effect heating to the region along the sidewalls, typical interelectrode resistances are illustrated as relatively small and thus low resistance in the molten glass for the short path between adjacent electrodes of opposite polarity along a common sidewall as A to A' along wall 29 and B to B' along wall 27. In practice, no current flow or Joule effect heating will occur across the conditioning section since separate circuit means are connected to the electrode pairs on each sidewall.

In the embodiment illustrated in FIG. 1, the electrode pairs B–B' on sidewall 27 are supplied from circuit means 55 and the pairs A–A' of sidewall 29 are supplied from circuit means 57. Since each element of circuit means 55 and 57 correspond in similar relationship, those of 57 will be designated with the same reference character as 55 and distinguished therefrom by primes.

The pairs of electrodes 25 and 25' arranged with adjacent electrodes on each side of opposite polarity, as B to B' and A to A' are connected to a transformer 59 and 59' by conductors 63 and 65 and 63' and 65' respectively. The primary of each transformer 59 and 59' is connected to an individual current controller 67 and 67' which can be set to a given level manually by control 68 or can be made responsive by means of a manual-automatic selector switch 69 to a suitable temperature signal derived from sensors arranged to respond to temperatures of the glass proximate the respective sidewall. Current controllers 67 and 67' are supplied with current from a source such as a transformer (not shown) having a single or pair of secondary windings connected through controller 67 to the primary of transformer 59 and through controller 67' to the primary of transformer 59'. Thus, the current between paired electrodes 25 is controlled by controller 67 while that between paired electrodes 25' is controlled by controller 67' so that controller 67 controls the Joule effect heating of the glass proximate to conditioning section sidewall 27 and controller 67' controls it proximate sidewall 29.

A typical form of controller 67 is back to back phase angle controlled rectifiers wherein control can be manual or automatic. These include conventional phase angle control firing circuits for control electrodes selectively responsive to a manually set control of a temperature control operating to a set point. Temperature sensing devices 71 and 71' can be provided in the vicinity of each sidewall to indicate the temperature levels of the glass in that vicinity. One arrangement utilizes a tri-level thermocouple assembly 71 having three thermocouples, although a greater number of thermocouples could be used, along a column immersed in the molten glass. A typical tri-level assembly includes a bottom, middle and upper thermocouple 72, 73 and 74 respectively carried by the assembly 71. The bottom thermocouple 72 is located near the lower end of assembly 71. The middle thermocouple 73 is near the mid depth level of the molten glass. The top thermocouple 74 is close to the surface of the glass. In a molten glass flow-path of about 15 cm. (six inches) depth, the thermocouples 72, 73 and 74 can be located at depths of about 12.7 cm. (five inches), 7.6 cm. (three inches), and 2.5 cm. (one inch) in the glass respectively. Each of the temperature sensing devices can be connected selectively as by leads 75 to a multi-channel temperature indicator 76 such as a Doric digital readout device sold by Doric Instrument Company. In FIG. 1, only center thermocouple assembly 71" is shown so connected although it is to be understood that each assembly 71 and 71' can be similarly connected. In this manner each thermocouple is coupled to an instrument which can give visual readings and/or record temperatures. Temperature signals from the thermocouples can also be used to control the current applied for Joule effect heating through connection to the current controller 67, either directly or through an auxiliary control device.

Typically, the mid depth side thermocouples 73 and 73' have been employed to provide the signal for current control for the individual sidewall region Joule effect heating in this optimized temperature control system. However, on occasion where the couples 72 and 72' exhibit the more critical temperature condition, these have been used as the temperature sensors for the purpose of controlling the Joule effect heating. With both sides subject to separate control, glass temperatures on the opposite sides of the conditioning section have been maintained with 1° C. of each other and the temperature at the center line of the glass flow path at the inlet 23.

The central temperature sensing device 71", which also is a tri-level thermocouple, can be used to control the temperature at the glass surface by adjusting the heat applied from sources above the glass, either as a radiant heat source or as a heat extracting gas flow.

Joule effect heating along each sidewall region of the molten glass between adjacent electrodes can be controlled manually by setting the manual-automatic selector 69 of current control circuit 67 to "Manual" and adjusting the control level switch 68 of that control. In conjunction with such operation temperatures at the several levels in the center and along each side of the conditioning section can be monitored by sensing devices 71, 71' and 71" at each of their several levels by selection controls on indicator 76, either at display 77 or on a recorder chart (not shown). For example, the net heat applied or extracted at the surface of the flow path can be balanced against the individual Joule effect heating of the sidewalls due to controlled electric currents between A to A' and B to B' by an attendant observing temperatures on display 77 for the various levels of thermocouples in sensing devices 71, 71' and 71". Alternatively, the system can be set for automatic operation at selectors 69 and 69'. In such operating mode, automatic control circuits 78 and 78' provide the current control function of control level switch 68 in regard to a set point temperature set at controller 79 or 79' of the automatic control circuits.

The automatic controllers 78 each comprise a comparator circuit having a temperature calibrated adjustable set point to issue a control signal to the current controller on lead 81 such that deviations from a preset set-point level cause corrective signals to be issued to the current controller 67 whereby the Joule effect heating is increased in response to a sensed decrease in temperature from the set-point and decreased for a sensed increase in temperature from the set-point. Temperature signals indicating glass temperature as sensed by 71 and 71', usually at the mid depth thermocouples 73 and 73' are transmitted over leads 82 and 82' to the automatic controllers 78 and 78' and the comparator issues signals appropriate for the difference between the sensed and set-point signals to cause a control signal on leads 81 or 81' to control circuits 67 or 67'. Thus, with settings for temperatures corresponding to the mid stream temperatures of the molten glass called for in the sidewall regions, the individual control circuits 67 and 67' will bring the amount of Joule effect heating in those regions to a level establishing an essentially uniform temperature across the glass cross section and thus an essentially uniform delivery temperature of glass to feeder 13.

The individual sidewall controls can also be employed to overcome or counteract heat unbalances where it is desirable to trim heating at one sidewall region to a somewhat different but controlled temperature from that at the other sidewall region since each set point control 79 and 79' can be adjusted individually.

The method of equalizing the temperature across the cross section of a molten glass flow path through a forehearth by immersing electrodes in the molten glass along the opposed side of its flow path, passing current through the glass between the electrodes on common sides of the molten glass flow path, and separately controlling the magnitude of the electrical current passed by electrodes on each side of the flow path to separately control the Joule effect heating of the glass on each side has been illustrated with like controls for each of the first and second paired electrodes on the first and second sidewalls of the forehearth. It is to be appreciated that different but separate controls can be employed for each side, for example, the control for one side might be manually adjusted and the control for the opposite side automatically adjusted. Accordingly, the above disclosure is to be read as illustrative and not in a limiting sense.

We claim:

1. Apparatus for equalizing the temperature across the cross section of a mass of molten glass flowing through a forehearth comprising first and second spaced apart sidewalls of said forehearth extending along the path of flow of molten glass, first adjacent paired electrodes extending through said first sidewall and immersed in said molten glass, second adjacent paired electrodes extending through said second sidewall and immersed in said molten glass, said adjacent paired electrodes being spaced from each other a distance to define a relatively short electric current path in said molten glass, first circuit means connected to said first paired electrodes to cause current to flow and Joule effect heating within the molten glass adjacent the first sidewall, second circuit means connected to said second paired electrodes to cause current to flow and Joule effect heating within the molten glass adjacent the second sidewall, a source of electrical current connected to each of said circuit means, a first current controller in said first circuit means for controlling the amount of Joule effect heating within the molten glass adjacent the first sidewall, and a second current controller in said second circuit means for controlling the amount of Joule effect heating within the molten glass adjacent the second sidewall.

2. Apparatus according to claim 1 wherein said first and second current controllers individually control the current in the respective first and second circuit means and in the molten glass flow path adjacent the respective first and second sidewalls.

3. Apparatus according to claim 1 wherein said first and second current controllers each include an individual manually actuable control means.

4. Apparatus according to claim 1 including a feeder at the downstream end of said forehearth and wherein said electrodes are adjacent said feeder in a conditioning section of said forehearth.

5. Apparatus according to claim 1 wherein said first and second paired electrodes each comprise four to six electrodes.

6. Apparatus according to claim 1 wherein said first and second current controllers each include an individual thermally actuable control means.

7. Apparatus according to claim 6 wherein said thermally actuable control means includes a temperature sensor within said molten glass flow path and means responsive to said sensor to actuate said control.

8. Apparatus according to claim 6 wherein said thermally actuable control means for said first current controller includes a first temperature sensor within said molten glass flow path adjacent said first sidewall and means responsive to said first sensor to actuate said control means; and wherein said thermally actuable control for said second current controller includes a second temperature sensor within said molten glass adjacent said second sidewall, and means responsive to said second sensor to actuate said control.

9. Apparatus according to claim 8 wherein said first sensor is downstream in the flow direction of said molten glass from at least a pair of said first adjacent paired electrodes and said second sensor is downstream in the flow direction of said molten glass from at least a pair of said second adjacent paired electrodes.

10. Apparatus according to claim 9 wherein each electrode of said paired electrodes is spaced longitudinally of said forehearth from electrodes with which it is paired at about mid depth in said flow of molten glass and said first and second sensors are at about mid depth in said flow of molten glass.

11. Apparatus according to claim 6 including a first adjustable temperature set point means for said first current controller; a second adjustable temperature set point means for said second current controller; a first temperature sensor within said molten glass flow path adjacent said first sidewall, said first current controller control means being responsive to said first temperature sensor and said first set point means; and a second temperature sensor within said molten glass flow path adjacent said second sidewall, said second current controller control means being responsive to said second temperature sensor and said second set point means.

12. Apparatus according to claim 1 wherein each electrode of said paired electrodes is spaced longitudinally of said forehearth from electrodes with which it is paired.

13. Apparatus according to claim 12 wherein said first and second circuit means are connected to said respective paired electrodes to impose opposed electrical polarities on adjacent paired electrodes.

14. Apparatus according to claim 12 wherein each electrode of said first paired electrodes is located in a common cross section normal to the length of said forehearth containing an electrode of said second paired electrodes, wherein said first and second circuit means are connected to impose like electrical polarities to electrodes in each common cross section.

15. The method of equalizing the temperature across the cross section of a molten glass flow path through a forehearth comprising immersing electrodes in the molten glass along the opposed sides of its flow path, passing electrical current for Joule effect heating through the glass between electrodes on common sides of the molten glass flow path, and separately controlling the magnitude of the electrical current passed by electrodes on each side of the molten glass flow path to separately control the Joule effect heating of the glass on each side of the flow path.

16. The method of claim 15 including sensing the temperature of the molten glass on each side of its flow path and controlling the magnitude of the electrical current in response to said temperature.

17. The method of claim 16 wherein the control of the magnitude of the electrical current on one side of the molten glass flow path is responsive to the temperature sensed on that one side of the molten glass flow path.

18. The method of claim 17 wherein the sensing of the temperature on one side of the molten glass flow path is at a location downstream along the molten glass flow path from at least one pair of electrodes immersed along the one side.

19. The method of claim 16 including establishing a temperature set point for the molten glass on each side of the molten glass flow path, and wherein the control of the magnitude of the electrical current to the electrodes on each side of the molten glass flow path adjusts the Joule effect heating on that side of the molten glass flow path toward the established temperature set point.

* * * * *